United States Patent
Kuehner et al.

(10) Patent No.: US 12,420,819 B2
(45) Date of Patent: Sep. 23, 2025

(54) INCREASING OPERATOR CONFIDENCE OF AN ACTIVE DRIVING AUTOMATION SYSTEM BY MODIFYING LONGITUDINAL VEHICLE DYNAMICS

(71) Applicant: TOYOTA JIDOSHA KABUSHIKI KAISHA, Toyota (JP)

(72) Inventors: Manuel Ludwig Kuehner, Mountain View, CA (US); Hiroshi Yasuda, San Francisco, CA (US); Andrea Michelle Rios Lazcano, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 18/159,680

(22) Filed: Jan. 25, 2023

(65) Prior Publication Data

US 2024/0246553 A1    Jul. 25, 2024

(51) Int. Cl.
*B60W 50/14* (2020.01)
*B60W 30/16* (2020.01)
*B60W 60/00* (2020.01)

(52) U.S. Cl.
CPC .......... *B60W 50/14* (2013.01); *B60W 30/16* (2013.01); *B60W 60/0013* (2020.02); *B60W 2720/106* (2013.01)

(58) Field of Classification Search
CPC .. B60W 50/14; B60W 30/16; B60W 60/0013; B60W 2720/106; B60W 2754/30
See application file for complete search history.

(56) References Cited

U.S. PATENT DOCUMENTS

| | | | | |
|---|---|---|---|---|
| 5,014,200 A | * | 5/1991 | Chundrlik | B60W 30/16 340/904 |
| 5,454,442 A | * | 10/1995 | Labuhn | B60K 31/0008 340/904 |
| 6,233,515 B1 | * | 5/2001 | Engelman | G05B 13/042 180/169 |
| 9,308,914 B1 | * | 4/2016 | Sun | B60W 60/0051 |
| 11,318,958 B2 | | 5/2022 | Qin | |
| 2005/0055150 A1 | * | 3/2005 | Uhler | B60W 30/16 701/93 |
| 2007/0276577 A1 | * | 11/2007 | Kuge | B60W 10/184 340/436 |
| 2010/0179741 A1 | * | 7/2010 | Pelosse | B60W 30/18145 701/96 |
| 2015/0175162 A1 | * | 6/2015 | Nakadori | B60W 30/16 701/96 |
| 2016/0214480 A1 | * | 7/2016 | Solyom | B60W 30/16 |
| 2017/0137029 A1 | * | 5/2017 | Dynes | B60W 30/18072 |
| 2018/0281791 A1 | * | 10/2018 | Fukaya | B60W 30/095 |
| 2018/0345964 A1 | * | 12/2018 | Fujii | B60W 50/14 |
| 2020/0298877 A1 | | 9/2020 | Takamatsu | |

(Continued)

FOREIGN PATENT DOCUMENTS

CN        112810609 A        5/2021

*Primary Examiner* — Anne Marie Antonucci
*Assistant Examiner* — Patrick Daniel Mohl
(74) *Attorney, Agent, or Firm* — SHEPPARD, MULLIN, RICHTER & HAMPTON LLP; Daniel N. Yannuzzi

(57) ABSTRACT

Systems and methods are provided to notify an operator of an active and correctly operating driving automation system. More specifically, the notification is executed through modulation of longitudinal vehicle dynamics based on cruising speed or following distance to a leading vehicle.

20 Claims, 6 Drawing Sheets

(56) References Cited

U.S. PATENT DOCUMENTS

| | | | |
|---|---|---|---|
| 2020/0387167 A1* | 12/2020 | Sujan | B60W 30/143 |
| 2021/0276571 A1 | 9/2021 | Breton | |
| 2022/0402487 A1* | 12/2022 | He | B60W 30/16 |
| 2024/0190432 A1* | 6/2024 | Alenius | B60W 30/182 |

* cited by examiner

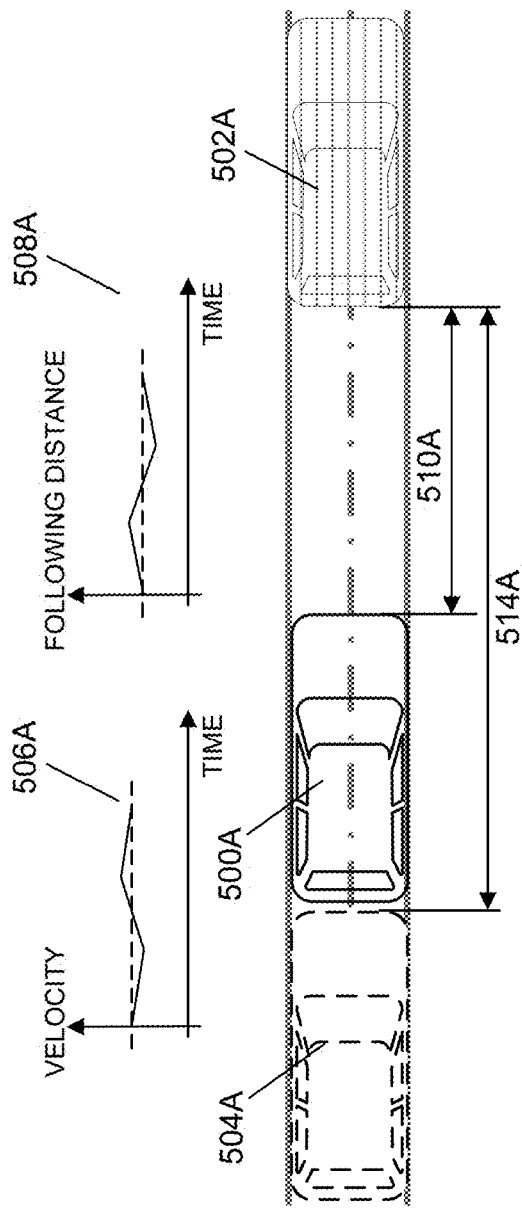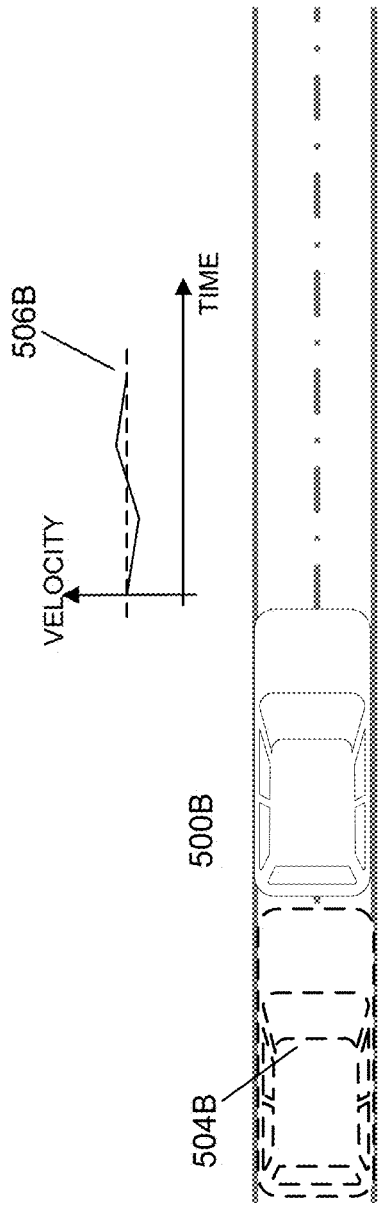
FIG. 5A
FIG. 5B

INCREASING OPERATOR CONFIDENCE OF AN ACTIVE DRIVING AUTOMATION SYSTEM BY MODIFYING LONGITUDINAL VEHICLE DYNAMICS

TECHNICAL FIELD

The present disclosure relates generally to an automotive system and more particularly, some examples relate to a system of increasing operator trust and confidence of an active and correctly operating driving automation system. Some implementations may relate to modulating longitudinal vehicle dynamics (or speed) of the vehicle as means of increasing operator confidence.

DESCRIPTION OF RELATED ART

A driving automation system is capable of delivering a comfortable ride that is comparable to a skilled chauffeur. In a vehicle employing the driving automation system, the role of vehicle operation is shared between an operator and the driving automation system of the vehicle or is exclusive to the driving automation system during full automation. The distribution of roles becomes more favorable for the driving automation system with increasing levels of autonomous driving. At lower levels of autonomous driving levels, such as at levels 1 and 2, the operator must retain some control of the vehicle. However, at higher levels, such as at levels 3 through 5, controls are provided by the driving automation system, relieving the operator to do as they please. Under these conditions, the operator may partake in comfort or entertainment enhancing non-driving related activities that may reduce operator awareness of or punctuality in response to, e.g., driving conditions.

BRIEF SUMMARY OF THE DISCLOSURE

According to various embodiments of the disclosed technology, a method of notifying an operator of a vehicle employing a driving automation system, the method can comprise: receiving a reference trajectory; calculating an offsetting longitudinal control signal based on the reference trajectory, wherein the offsetting longitudinal control signal includes one or more longitudinal control signals that control the vehicle to follow a trajectory that deviates from the reference trajectory; and executing the offsetting longitudinal control signal followed by a correction control signal, wherein the correction control signal instructs the vehicle to follow the reference trajectory.

In some embodiments, the one or more longitudinal control signals include at least one instance of acceleration or deceleration of the vehicle.

In some embodiments, the reference trajectory includes at least one of an ideal cruising speed or an ideal following distance to a leading vehicle.

In some embodiments, the trajectory that deviates from the reference trajectory deviates by an extent that is expected from a safe human driver.

In some embodiments, the method is executed periodically based on some passage of one of time, distance, or combination of both.

In some embodiments, calculating the offsetting longitudinal control signal based on the reference trajectory is further based on vehicle sensor information.

In some embodiments, in response to a toggle switch signaling for a perpetual operating condition, the correction control signal instructs the vehicle to follow another trajectory that overshoots the reference trajectory, instead of the reference trajectory.

According to various embodiments of the disclosed technology, a vehicle control system can comprise: a controller for vehicle longitudinal control dynamic; a processor; and a memory coupled to the processor to store instructions, which when executed by the processor, cause the processor to perform operations, the operations comprising: receiving a reference trajectory; calculating an offsetting longitudinal control signal based on the reference trajectory, wherein the offsetting longitudinal control signal includes one or more longitudinal control signals that control the vehicle to follow a trajectory that deviates from the reference trajectory; and executing the offsetting longitudinal control signal followed by a correction control signal, wherein the correction control signal instructs the vehicle to follow the reference trajectory.

In some embodiments, the one or more longitudinal control signals include at least one instance of acceleration or deceleration of the vehicle.

In some embodiments, the reference trajectory includes at least one of an ideal cruising speed or an ideal distance to a leading vehicle.

In some embodiments, the trajectory that deviates from the reference trajectory deviates by an extent that is expected from a safe human driver.

In some embodiments, the method is executed periodically based on some passage of one of time, distance, or combination of both.

In some embodiments, calculating the offsetting longitudinal control signal based on the reference trajectory is further based on vehicle sensor information.

In some embodiments, the system further comprises a toggle switch and in response to a toggle switch signaling for a perpetual operating condition, the correction control signal instructs the vehicle to follow another trajectory that overshoots the reference trajectory, instead of the reference trajectory.

According to various embodiments of the disclosed technology, a non-transitory machine-readable medium having instructions stored therein, which when executed by a processor, cause the processor to perform operations, the operations can comprise: receiving a reference trajectory; calculating an offsetting longitudinal control signal based on the reference trajectory, wherein the offsetting longitudinal control signal includes one or more longitudinal control signals that control the vehicle to follow a trajectory that deviates from the reference trajectory; and executing the offsetting longitudinal control signal followed by a correction control signal, wherein the correction control signal instructs the vehicle to follow the reference trajectory.

In some embodiments, the one or more longitudinal control signals include at least one instance of acceleration or deceleration of the vehicle.

In some embodiments, the reference trajectory includes at least one of an ideal cruising speed or an ideal distance to a leading vehicle.

In some embodiments, the trajectory that deviates from the reference trajectory deviates by an extent that is expected from a safe human driver.

In some embodiments, the method is executed periodically based on some passage of one of time, distance, or combination of both.

In some embodiments, calculating the offsetting longitudinal control signal based on the reference trajectory is further based on vehicle sensor information.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5A-B illustrate implementations of an autonomous driving feedback system that uses modulation of longitudinal vehicle dynamics.

Figure 1:
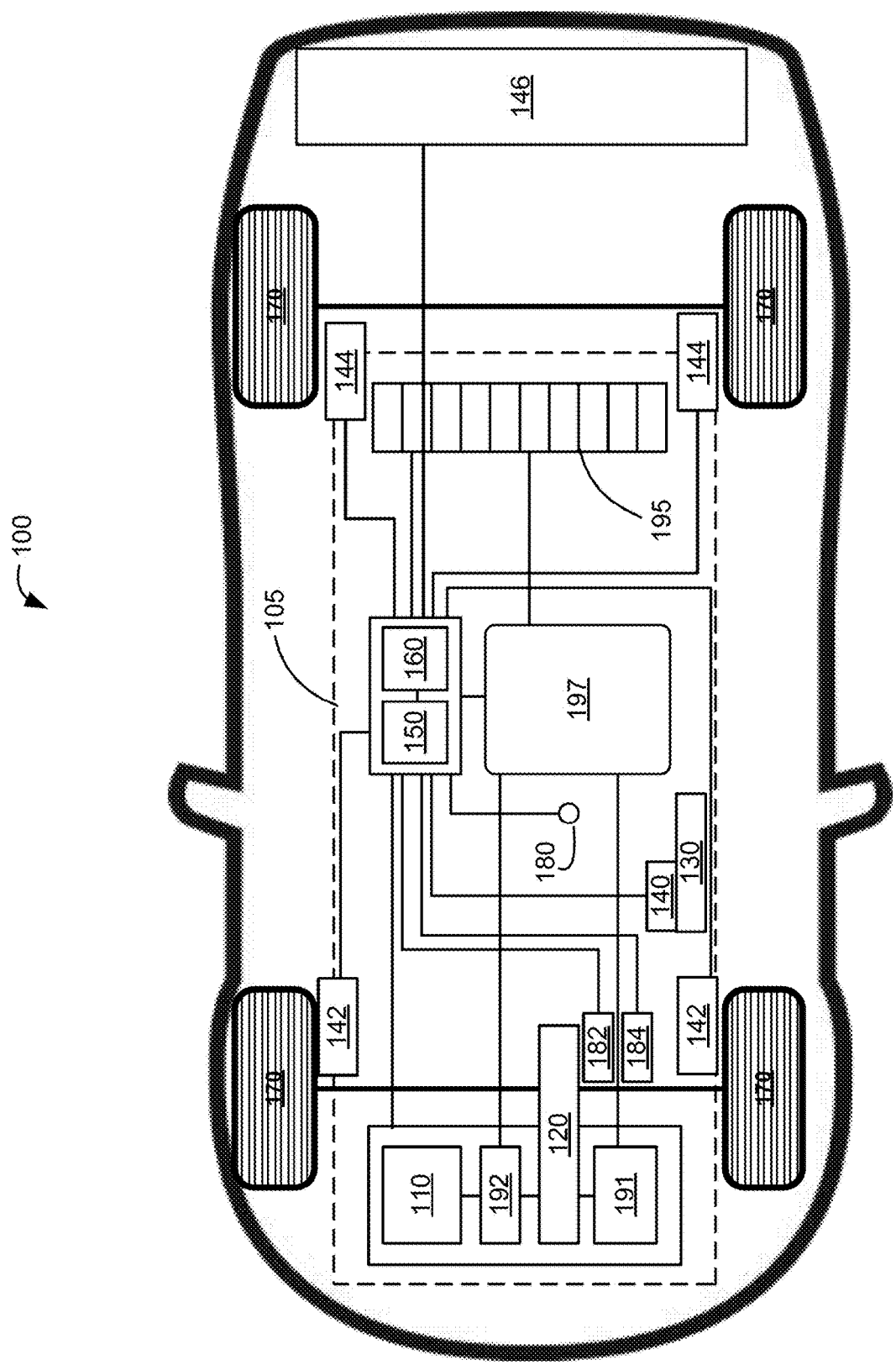
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

A driving automation system is employed to drive a vehicle on all types of roads, relieving the operator from any driving responsibilities. Accordingly, operators may partake in comfort or entertainment enhancing non-driving related activities during their travel. On long, nearly straight roads with free flowing freeways, the operator may struggle to distinguish an active driving automation system from an unplanned driving automation system disengagement. A similar issue arises when an active driving automation system does not correctly perceive the driving situation and therefore just goes straight. Operator receptivity to an unplanned disengagement or incorrectly operating driving automation system is reduced because of the non-driving related activities compromising operator awareness to visual or auditory cues. Furthermore, the minimal experience of lateral or longitudinal acceleration further reduces operator receptivity to these events. Stated differently, these issues are likely enhanced by a lack of micro-adjustments or micro-corrections to vehicle trajectory that can be recognized by the operator despite auditory or visual distractions. Rather than diminishing ride comfort or entertainment by actively alerting the operator with visual, auditory, and haptic cues that interfere with the non-driving related activities, systems and methods to discreetly notify the operator of an active and correctly operating driving automation system through a series of micro-adjustments or micro-corrections are needed.

Embodiments of the systems and methods disclosed herein may be configured to increase operator confidence of an active and correctly operating driving automation system through modulation of longitudinal vehicle dynamics (LVD).

A driving automation system can be used in a vehicle, where the driving automation system at least, in part, controls or manages vehicle operation to varying levels of autonomous control or advanced assistance. The varying levels of autonomous control or advanced assistance at least include controlling the speed of the vehicle. Accordingly, the driving automation system refers to levels of driving automation from those that provide driver assistance, such as adaptive cruise control, through full automation, i.e. driving automation levels 1 through 5. When a vehicle undergoes change in speed, i.e. referring to either acceleration or deceleration, the operator feels inertial forces of being pressed back into their seat during acceleration or pressed forward into their seatbelt during deceleration. The operator will also visually recognize the change in speed. When active, this system, as part of the driving automation system or a separate vehicle system, intentionally instructs longitudinal control signals that offset the vehicle from the desired vehicle trajectory at a random direction and magnitude of error in order to mandate a generation of correction control signals that instructs the vehicle to follow the desired trajectory. For example, the offsetting control signal may instruct for over-acceleration above a desired speed, which forces the driving automation system to decelerate to compensate for the imprecise signal. Conversely, the offsetting vehicle control signal may instruct for over-deceleration below a desired speed, which forces the driving automation system to accelerate to compensate for the offset signal. The sequence of executing in accordance with offsetting longitudinal control signal and its subsequent correction control signal is referred to as an LVD modulation. The executing of maneuvers in accordance with the correction control signals is the micro-adjustments or micro-corrections referenced above. The LVD modulation is felt through inertial forces and optionally visibly recognized by the operator, thereby increasing operator confidence of an active and correctly operating driving automation system.

In various embodiments, an autonomous driving feedback system is employed to generate the offsetting longitudinal control signals. The autonomous driving feedback system in a vehicle determines a reference trajectory for the autonomous vehicle along a leading roadway segment. The reference trajectory, may refer to the spatial or geometrical direction of the vehicle, but also considers the vehicle's velocity/speed. The offsetting longitudinal control signals instructs the vehicle to deviate from the reference trajectory. In some embodiments, the reference trajectory coincides, at least approximately, with a cruising speed or a following distance to a leading vehicle. The reference cruising speed or following distance may be termed as a "normal" or "ideal" operating speed or following distance to the leading vehicle. In other embodiments, the offsetting longitudinal control signal may be based on vehicle sensor data, such as from internal sensors that monitor operator awareness, or external sensors that monitor an environment external to the vehicle. The autonomous driving feedback system may temporarily be disengaged if the vehicle detects operator awareness of an active driving automation system. For example, internal sensors may be used to monitor/detect driver attentiveness by tracking movement of the operator's eyes, in this instance, sensing that the operator is looking at the status of an active driving automation system. Similarly, the autonomous driving system may be temporarily disengaged if there are environmental factors that impact vehicle operation, such as existence of obstacles, poor weather conditions, or sharp road curvatures, wherein execution of the offsetting longitudinal control signals may impact safety or ride comfort.

The autonomous driving feedback system may periodically execute LVD modulation. In other embodiments, the autonomous driving feedback system perpetually instructs LVD modulation during an active driving automation system. In this example, the correction signal is also an offsetting longitudinal control signal that instructs the vehicle to deviate from the reference trajectory, resulting in the need for a subsequent correction signal that will also force the vehicle to deviate from the reference trajectory. Here, the resulting deviation overshoots the change in speed to follow the reference trajectory. The resulting effect is one of perpetual correction of preceding control signals.

In some embodiments, the deviation from the normal or ideal speed or distance to a leading vehicle may be limited. Changes in speed that greatly deviate from the normal or ideal speed may make the operator feel uncomfortable, reduce vehicle safety, or may cause the vehicle to operate faster than applicable legal speed limits. Accordingly, the deviation from the normal speed and distance to the leading vehicle will be limited based on safe driving constraints. Therefore, the autonomous driving feedback system may be configured to limit the deviation of speed or following distance to a leading vehicle while notifying the operator of an active and correctly operating driving automation system.

The systems and methods disclosed herein may be implemented with any number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types. An example hybrid electric vehicle (HEV) in which embodiments of the disclosed technology may be implemented is illustrated and described below as one example, but the hybrid electric nature of the vehicle is not necessary for the operation of the disclosed technology, nor is it limiting on the disclosed technology.

FIG. 1 is a schematic representation of an example vehicle with which embodiments of the systems and methods disclosed herein may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode (also referred to as regenerative braking). The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed (NE) of engine 110 independently of the vehicle speed (V).

ECU 150 may include circuitry to control the above aspects of vehicle operation. ECU 150 may include, for example, a microcomputer that includes one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG 191. It should be understood that in embodiments where MGs 191, 192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG 191 during regenerative coasting and braking.

Brake assemblies 142 and 144 are brakes suitable for HEVs. Brake assemblies 142 and 144 may be controlled by ECU 150 or by the driver through brake pedal 130 and brake pedal sensor 140. Brake assemblies 142 and 144 may be different type. For example, the front brake assemblies 142 may be of disc type (e.g., caliper with brake pads and rotor in between) and the rear brake assemblies 144 may be of drum type (e.g., brake shoes within a drum housing). Braking signal can be distributed evenly among brake assemblies 142 and 144 or have uneven distribution. For example, brake assemblies 142 may endure 80% of the braking force, while brake assemblies 144 may endure 20% of the braking force.

Brake inputs from brake pedal 130 may also result in activation of air brake 146. Air brake 146 may consist of a single aerodynamic control surface, or may include multiple control surfaces, which may include only of a rear spoiler, but may also include a front splitter (not shown), scoops (not shown), or other panels or ducts that will increase the drag coefficient of the vehicle.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally), battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
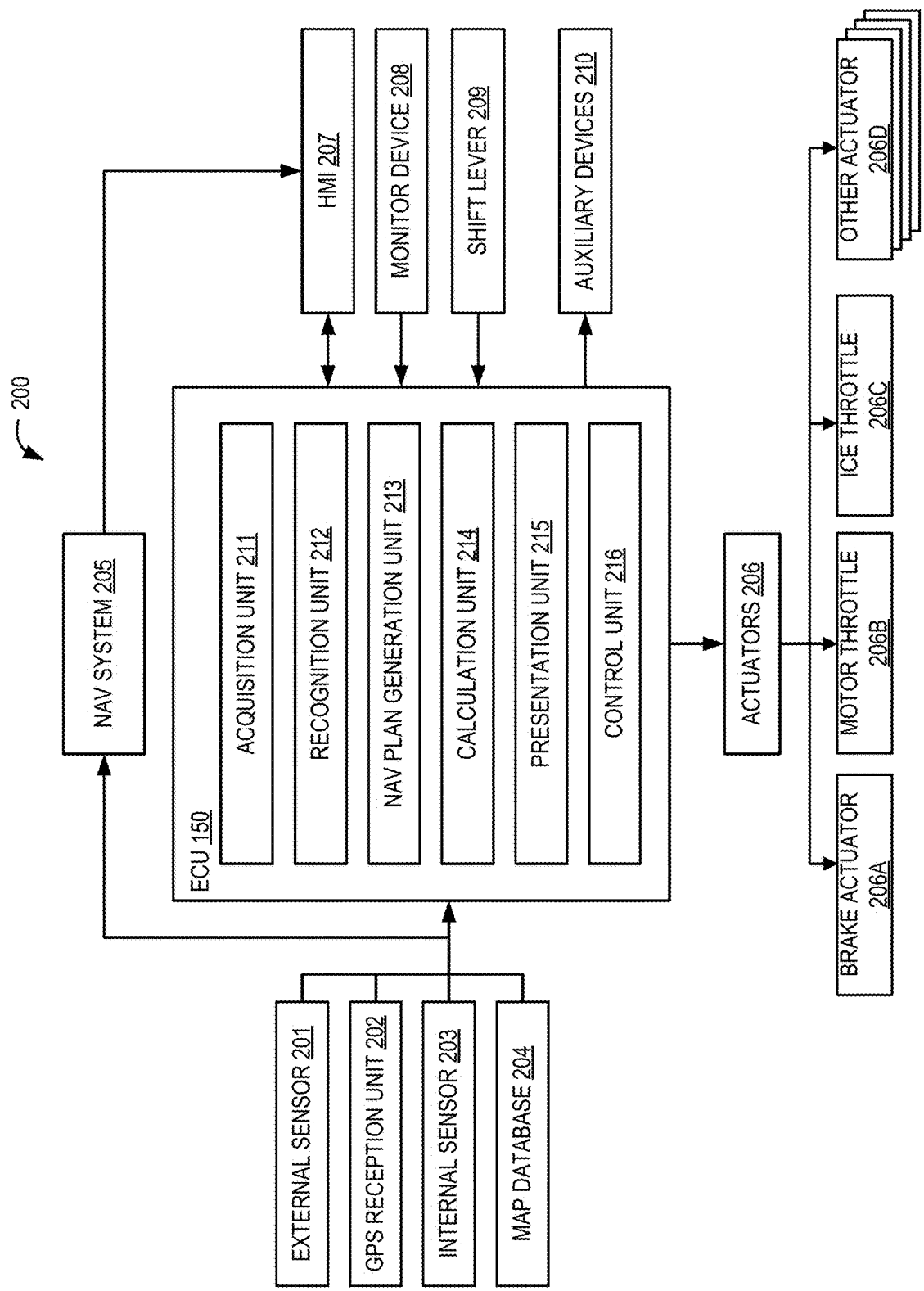
FIG. 2 illustrates an example vehicle system that includes autonomous control functionality.

FIG. 2 illustrates an example vehicle system that includes autonomous control functionality. Here, autonomous control system 200 may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, general movement of the vehicle, without necessarily depending or relying on driving operations/directions by a driver or operator of the vehicle.

As an example, autonomous control may include lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation. As alluded to above, other autonomous control may include assistive driving mechanisms in the form of, e.g., visual or audible alerts or warnings, indirect haptic feedback, such as vibrating the driver's seat, etc.

As another example, autonomous control may include navigation control, where when there is no preceding vehicle in front of the HEV 100, constant speed (cruise) control is effectuated to make HEV 100 run at a determined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold. When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control.

In the example shown in FIG. 2, external sensor 201, a GPS (Global Positioning System) reception unit 202, an internal sensor 203, a map database 204, a navigation system 205, actuators 206, an HMI (Human Machine Interface) 207, a monitor device 208, a shift lever 209, and auxiliary devices 210 are provided. Autonomous control system 200 may communicate with ECU 150, or in some embodiments may be implemented with its own ECU.

External sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

Internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor.

Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, ICE throttle actuator 206C, Motor throttle actuator 206B, brake actuator 206A, and other actuator 206D (one example is a steering actuator). In some embodiments, other actuator 206D includes engine value control to initiate engine braking and MG control to engage regenerative braking. For example, ICE throttle actuator 206C controls, in accordance with a control signal output from the ECU 150, an amount by which to open the throttle of HEV 100 to control a driving force (the engine) of HEV 100. In another example, actuators 206 may include motor throttle actuator 206B that that control MGs 191 and 192, where a control signal is supplied from the ECU 150 to MGs 191 and/or 192 to output motive force/energy. Brake actuator 206A controls, in accordance with a control signal output from the ECU 150, the amount of braking force to be applied to each wheel of the vehicle. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and actuation mechanisms, such as buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflect one or more operating conditions/controls to effectuate the ideal route. For example, the navigation plan can include a target speed, an ideal acceleration, an ideal deceleration, an ideal direction, and/or an ideal steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Presentation unit 215 displays, on a display of the HMI 207, a status of the driving automation system.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. In some embodiments, calculation unit 214 is employed to aggregate data from acquisition unit 211, recognition unit 212, and/or navigation plan generation unit 213 in order to assist control unit 216 with delivering autonomous control of HEV 100.

Figure 3:
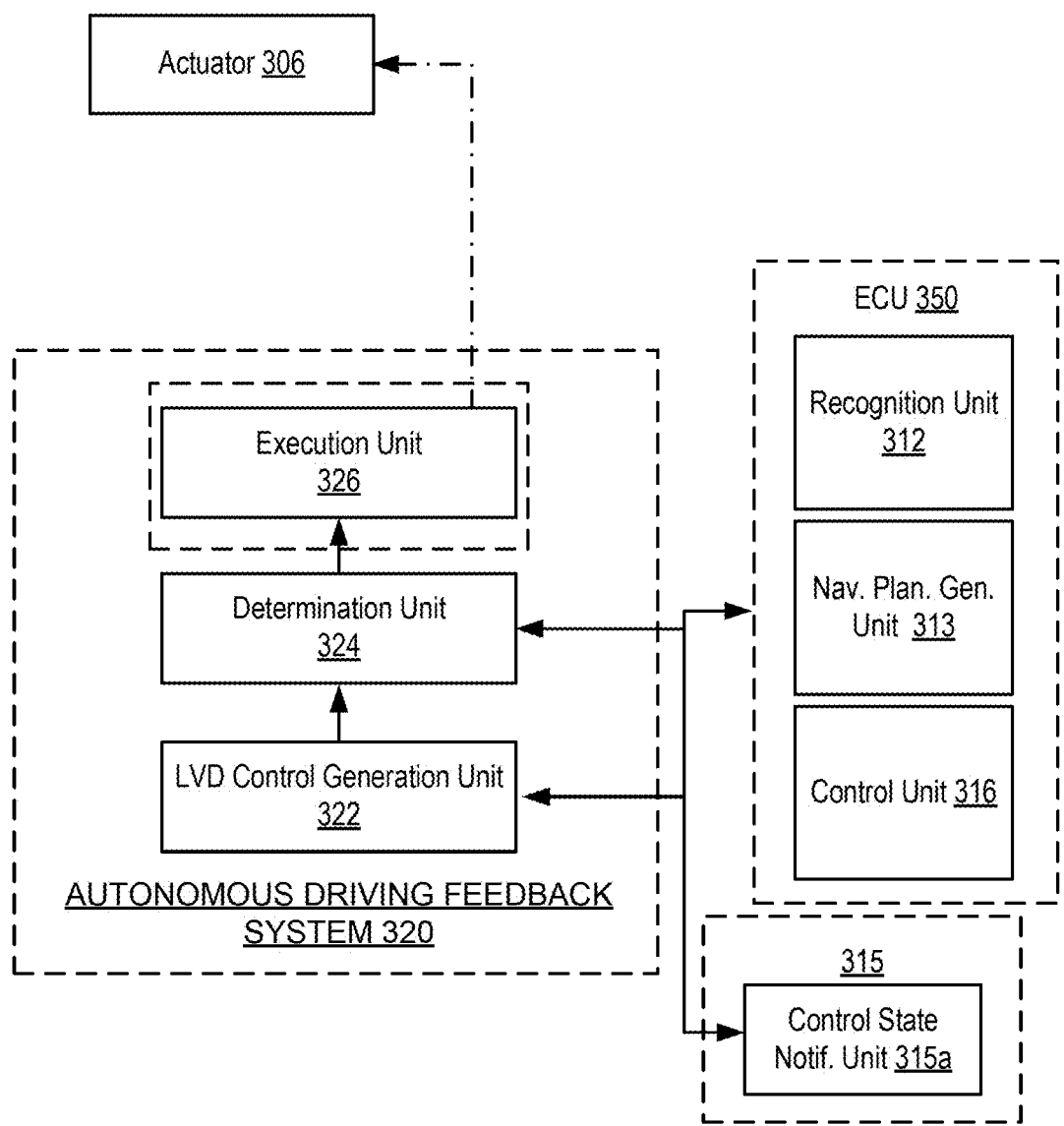
FIG. 3 illustrates one example implementation of a system which increases operator confidence using an autonomous driving feedback system.

FIG. 3 illustrates one example implementation of a system which increases operator confidence using an autonomous driving feedback system. The autonomous control system, such as autonomous control system 200 from FIG. 2, through ECU 350, operatively interacts with autonomous driving feedback system 320 that generates and sends instructions/executes modulation of LVD. In this example, ECU 350 is an embodiment of ECU 150 from FIG. 2. The autonomous driving feedback system 320 may be some processor or circuitry that is part of ECU 350 or may be part of an entirely separate vehicle system. Autonomous driving feedback system 320 may include LVD control generation unit 322, determination unit 324, execution unit 326, and toggle switch 328.

LVD control generation unit 322 may receive information from ECU 350 to facilitate generating offsetting longitudinal control signals. In some embodiments, the received information is in a form of a reference trajectory in a form of a target route from navigation plan generation unit 313, which is an embodiment of navigation plan generation unit 213 from FIG. 2. Based on the reference trajectory, LVD control generation unit 322 determines an offsetting trajectory that deviates from the reference trajectory. Using the offsetting trajectory, LVD control generation unit 322 may generate the offsetting longitudinal control signals. In some embodiments, the deviation is limited to what would normally occur during vehicle operation by a safe human driver.

In one embodiment, LVD control generation unit 322 intercepts the reference trajectory from navigation plan generation unit 313 and sends the inaccurate trajectory from LVD control generation unit 322 to control unit 316, which is an embodiment of control unit 216 from FIG. 2. In this embodiment, control unit 316 will base its control signals on the inaccurate trajectory thereby effectively recruiting control unit 316 to generate the offsetting longitudinal control signals.

In some embodiments, longitudinal control signals from control unit 316 are provided to LVD control generation unit 322. In these embodiments, the offsetting longitudinal control signals are modified versions of the longitudinal control signals from control unit 316. The reference trajectory from navigation plan generation unit 313 may accompany the longitudinal control signals from control unit 316. Under this embodiment, the resulting offsetting longitudinal control signals is still limited to that of a safe human driver.

In some embodiments, LVD control generation unit 322 may generate correction longitudinal control signals that redirect the vehicle in accordance with the reference trajectory from navigation plan generation unit 313 after execution of offsetting longitudinal control signals. In one embodiment, ECU 350 generates the correction longitudinal control signals and autonomous driving feedback system 320 only generates the offsetting longitudinal control signals.

Prior to generating an offsetting or correction longitudinal control signals, toggle switch 328 communicates with LVD control generation unit 322 confirming an active wait state of autonomous driving feedback system 320. Toggle switch 328 may be a physical switch accessible to the operator, or may be a switch that is triggered through other means.

In some embodiments, LVD control generation unit 322 generates correction longitudinal control signals that redirects the vehicle in accordance with an offset reference trajectory that deviates from the reference trajectory. In this embodiment, the correction longitudinal control signal under or over compensates the adjustments needed to direct the vehicle to follow the reference trajectory. This perpetual LVD modulation feature on the autonomous driving feedback system 320 may be triggered through toggle switch 328, that switches between a periodic LVD modulation feature and a perpetual LVD modulation feature.

Determination unit 324 determines whether or not the inaccurate trajectory or the offsetting longitudinal control signals and the correction longitudinal control signals can be sent for execution/executed, based on various factors. Determination unit 324 may review environmental factors predicated on travel along a certain type of roadway, e.g., known segment(s) of road within a map database, such as a freeway (versus) city roads. Environmental factors may also include an existence of surrounding traffic, weather conditions, road curvature, etc. Determination unit 324 may assess these environmental factors based on information from recognition unit 312, which is an embodiment of recognition unit 212 from FIG. 2. Determination unit 324 may make its determination based on one or more environmental factors. Determination may also be based on sensor information (i.e., those that are tracking the operator), elapsing of threshold time between LVD modulation or traveling of threshold distance between LVD modulation.

In the embodiments where a control signal is generated by the autonomous driving feedback system 320, when determination unit 324 determines that the offsetting longitudinal control signals can be executed, the offsetting longitudinal control signals may be sent to ECU 350 for execution. The sent offsetting longitudinal control signals may supersede the control signals generated by control unit 316. In other embodiments, autonomous driving feedback system 320 through execution unit 326 may control actuators 306 in accordance with the offsetting longitudinal control signals.

On the other hand, when determination unit 324 overrules the offsetting longitudinal control signals, the offsetting longitudinal control signals may be abandoned. Here, ECU 350 may continue to operate the vehicle without the involvement of autonomous driving feedback system 320. In some embodiments, execution unit 326 receives and executes the control signals from control unit 316.

In the embodiments where LVD control generation unit only generates the offsetting trajectory, determination unit 324 decides if the offsetting trajectory can be sent to control unit 316 to generate the longitudinal control signals in accordance with the offset trajectory.

In some embodiments, presentation unit 315 may include a control state notification unit 315a that notifies the driver of ongoing offsetting longitudinal control signals. Such notification may be displayed on a display of HMI 207, for example.

Figure 4:
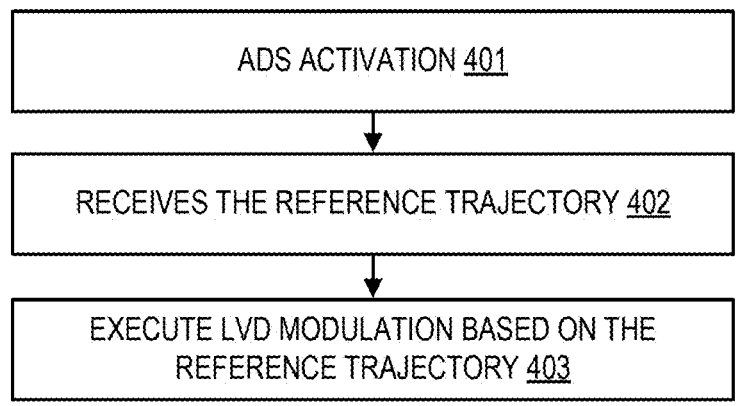
FIG. 4 Illustrates one example method of increasing operator confidence of an active and correctly operating driving automation system by a way of modulating longitudinal vehicle dynamics.

FIG. 4 Illustrates one example method of increasing operator confidence of an active and correctly operating driving automation system by a way of modulating LVD. Such a method determines the degree of imprecision of LVD signals and maneuver in accordance with the offsetting longitudinal control signals and correction signals.

As an initial consideration, the autonomous driving feedback system, such as autonomous driving feedback system 320 from FIG. 3, usually does not proceed unless a driving automation system has been activated. This functionality is enacted by the autonomous driving feedback system reading signals sent from an ECU, such as from ECU 150 of FIG. 2, to see if the ECU is commanding movement of the vehicle. For example, the autonomous driving feedback system may be embedded with instructions that upon receiving a signal or notification of the ECU engaged in a driving automation system, will go into an active wait state wherein the disclosed methods may proceed. These instructions may also consider a toggle switch, such as toggle switch 328 from FIG. 3. Once the autonomous driving feedback system has entered an active wait state, operation 401 is completed. Upon receipt of a signal or notification of the ECU discontinuing driving automation system movement of the vehicle or the toggle switch toggled to the off position, the autonomous driving feedback system will go into an inactive wait state and wait until receipt of another signal or notification of driving automation system reengagement.

At operation 402, the autonomous driving feedback system receives the reference trajectory. Normally, the autonomous driving feedback system receives the reference trajectory from ECU or ECU components such as navigation plan generation unit 213 from FIG. 2, which may include desired rate of change of speed, desired speeds or following distances. The reference trajectory may also include the ideal route that considers information pertaining to obstacles surrounding the vehicle recognized by a recognition unit, such as recognition unit 212 from FIG. 2, and/or map information obtained from a map database. The autonomous driving feedback system may communicate directly with any one of the aforementioned sources of information. In some embodiments, the autonomous driving feedback system receives control signals from a control unit of the ECU, such as control unit 216 from FIG. 2, and extracts the reference trajectory information. The autonomous driving feedback system will at least receive one of an ideal speed, rate of change of speed, or deceleration with which the vehicle should be operated at any point(s) along the reference trajectory. In some embodiments, the received information may also include an ideal following distance to a leading vehicle. Receiving of any aforementioned information may complete operation 402.

At operation 403, the autonomous driving feedback system executes LVD modulation based on the reference trajectory. As alluded to above during explanation of FIG. 3, the autonomous driving feedback system may determine and send the offsetting longitudinal control signals and the correction control signals to the ECU of the autonomous control system, such as autonomous control system 200 from FIG. 2, or to the actuator through an execution unit, such as execution unit 326 from FIG. 3. The autonomous driving feedback system may calculate the offsetting longitudinal control signals based on the reference trajectory. In some embodiments the offsetting longitudinal control signals are generated by modifying at least one of the ideal speed, acceleration, deceleration, or following distance of the control signals from the control unit. In one embodiment, the autonomous driving feedback system may be preprogrammed with allowable deviations based on a safe human driver. These deviations are applied to the inaccurate trajectory or the longitudinal control signals from the control unit. In many embodiments, the offsetting longitudinal control signals are further limited by constraints of comfort, safety, and legal limits of the maneuver. Generation of the offsetting longitudinal control signals may undergo a review(s) by a determination unit of the autonomous driving feedback system, such as determination unit 324 of FIG. 3, or other driving automation systems.

The autonomous driving feedback system then may send for execution or execute the offsetting longitudinal control signals. The offsetting longitudinal control signals may be suggestions by the autonomous driving feedback system to the ECU of the autonomous control system that will then execute the offsetting longitudinal control signals. In some embodiments, the autonomous driving feedback system directly executes the offsetting longitudinal control signals using an execution unit, such as execution unit 326 from FIG. 3, to instruct the actuators controlling the vehicle's speed in accordance with the offsetting longitudinal control signals. For example, the autonomous driving feedback system may instruct actuators to apply deceleration through brake actuator 206A from FIG. 2, which may apply any combination of caliper braking, drum braking or braking through wind resistance generated by air control surfaces. Deceleration may also be applied through application of regenerative braking or engine braking through motor and engine actuators respectively. Furthermore, deceleration may also be applied through coasting, e.g. without any application of the aforementioned braking methods. Acceleration may be applied by any combination of motor(s) or engine through motor throttle actuator 206B and ICE throttle actuator 206C from FIG. 2 respectively.

To fully execute LVD modulation, the correction control signals are determined and applied. In some embodiments, the ECU recognizes the deviation from the reference trajectory due to the vehicle speed and location resulting from the offsetting longitudinal control signals and generates subsequent correction control signals to maneuver the vehicle in accordance with the reference trajectory. In one embodiment, the autonomous driving feedback system generates the correction signals in accordance with the reference trajectory. In some embodiments, the autonomous driving feedback system perpetually engages offsetting longitudinal control signals. In this embodiment, the autonomous control system or the autonomous driving feedback system will attempt to correct the vehicle trajectory. However, the autonomous driving feedback system will modify the correction control signals or intercept and replace the reference trajectory, resulting in the vehicle's subsequent and perpetual attempts to correct the preceding offsetting longitudinal control signals. This embodiment may be triggered by a switch, such as toggle switch 328 from FIG. 3. The execution of offsetting longitudinal control signal and the subsequent correction control signal, whether accurate or not, completes operation 403.

FIG. 5A and FIG. 5B illustrate implementations of an autonomous driving feedback system that modulates longitudinal vehicles dynamics. FIG. 5A illustrates an embodiment where a vehicle, under the control of a driving automation system, is following a leading vehicle. Vehicle 500A is following leading vehicle 502A at a distance portrayed as 510A. Upon activation of the autonomous driving feedback system, the control signals of the driving automation system is modified or superseded to adjust the following distance. The determined following distance may correlate with a level of error that is expected from a safe human driver. In this instance, the amount of deviation was determined to be a car length behind distance 510A. The autonomous driving feedback system then sends or executes the modified or superseding control signals that places vehicle 500A at 504A. Upon vehicle 500A reaching the position of 504A, the driving automation system and/or the autonomous driving feedback system controls the vehicle back to the ideal trailing distance 510A. The resultant changes in speed and distance are depicted on velocity change over time 506A and following distance over time 508A. In other embodiments, upon activation of the feedback system, the offsetting longitudinal control signal is based on the velocity of vehicle 500A. Here, the feedback system uses vehicle sensor data to restrict closing the distance to leading vehicle 502A and the following distance over time 508A is incidental to the velocity change.

FIG. 5B illustrates an embodiment where vehicle 500B is being controlled by a driving automation system. Vehicle 500B is maintaining a cruising speed on a long straight freeway. Upon activation of the autonomous driving feedback system, the control signals of the driving automation system is modified to adjust the speed of vehicle 500B. The determined speed may correlate with a level of error that is expected from a safe human driver. The autonomous driving feedback system then suggests an offsetting longitudinal control signal that places vehicle 500B at relative location 504B due to a decrease in speed. Upon vehicle 500B reaching the position of 504B, the driving automation system or the autonomous driving feedback system controls the vehicle back to the ideal cruising speed. The resultant change in speed is depicted on velocity change over time 506A.

Figure 6:
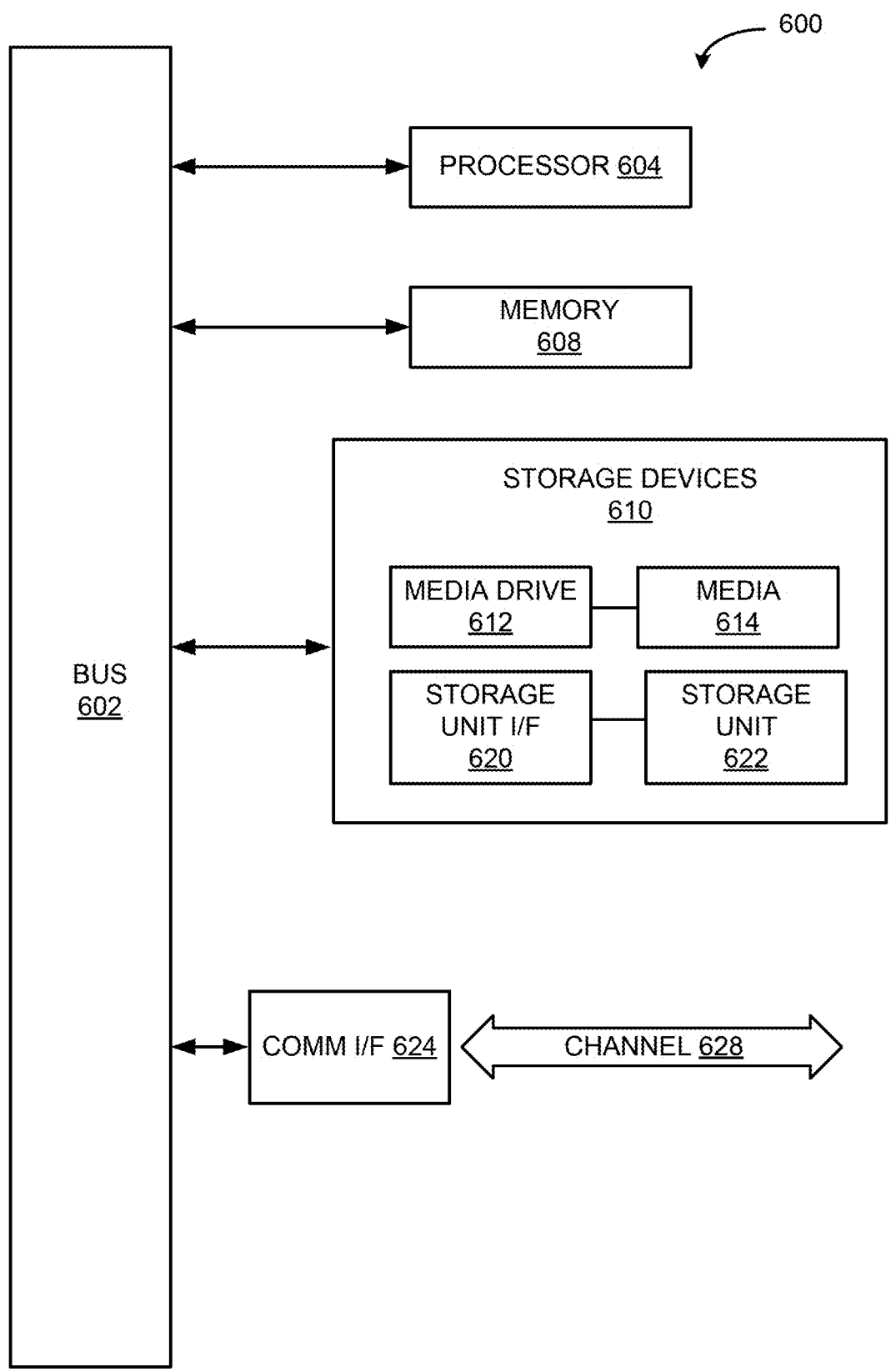
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. Processor 804 might be implemented using a general-purpose or special-purpose processing engine such as, for example, a microprocessor, controller, or other control logic. Processor 604 may be connected to a bus 802. However, any communication medium can be used to facilitate interaction with other components of computing component 800 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of notifying an operator of a vehicle employing a driving automation system, the method comprising:
   determining an offsetting longitudinal control signal to control the vehicle to deviate from a reference trajectory by a level of error sufficient to induce generation of a correction control signal to correct the vehicle's deviation from the reference trajectory, wherein determining the offsetting longitudinal control signal comprises generating a random direction and a random magnitude for the offsetting longitudinal control signal; and
   executing the offsetting longitudinal control signal followed by the correction control signal to modulate longitudinal vehicle dynamics of the vehicle, wherein inertial forces generated by modulating the longitudinal vehicle dynamics in response to the correction control signal notify the operator that the driving automation system is in an active state.

2. The method of claim 1, wherein the offsetting longitudinal control signal includes at least one instance of acceleration or deceleration of the vehicle.

3. The method of claim 1, wherein the reference trajectory includes at least one of a vehicle speed or a following distance to a leading vehicle.

4. The method of claim 1, wherein the offsetting longitudinal control signal controls the vehicle to deviate from the reference trajectory by undershooting and overshooting the reference trajectory by the level of error.

5. The method of claim 1, wherein the method is executed periodically based on some passage of one of time, distance, or combination of both.

6. The method of claim 1, wherein determining the offsetting longitudinal control signal is based on vehicle sensor information.

7. The method of claim 1, wherein in response to a toggle switch signaling for a perpetual operating condition, the correction control signal instructs the vehicle to follow another trajectory that overshoots the reference trajectory.

8. A control system for a vehicle employing a driving automation system, the control system comprising: a controller for longitudinal vehicle dynamics of the vehicle; a processor; and a memory coupled to the processor to store instructions, which when executed by the processor, cause the processor to perform operations, the operations comprising;
   determining an offsetting longitudinal control signal to control the vehicle to deviate from a reference trajectory by a level of error sufficient to induce generation of a correction control signal to correct the vehicle's deviation from the reference trajectory, wherein determining the offsetting longitudinal control signal comprises generating a random direction and a random magnitude for the offsetting longitudinal control signal; and
   executing the offsetting longitudinal control signal followed by the correction control signal to modulate longitudinal vehicle dynamics of the vehicle, wherein inertial forces generated by modulating the longitudinal vehicle dynamics in response to the correction control signal notify the operator that the driving automation system is in an active state.

9. The control system of claim 8, wherein the offsetting longitudinal control signal includes at least one instance of acceleration or deceleration of the vehicle.

10. The control system of claim 8, wherein the reference trajectory includes at least one of a vehicle speed or a following distance to a leading vehicle.

11. The control system of claim 8, wherein the offsetting longitudinal control signal controls the vehicle to deviate from the reference trajectory deviates by undershooting and overshooting the reference trajectory by the level of error.

12. The control system of claim 8, wherein the operations are executed periodically based on some passage of one of time, distance, or combination of both.

13. The control system of claim 8, wherein determining the offsetting longitudinal control signal is based on vehicle sensor information.

14. The control system of claim 8, wherein the system further comprises a toggle switch and in response to a toggle switch signaling for a perpetual operating condition, the correction control signal instructs the vehicle to follow another trajectory that overshoots the reference trajectory.

15. A non-transitory machine-readable medium having instructions stored therein, which when executed by a processor, cause the processor to perform operations, the operations comprising:
   determining an offsetting longitudinal control signal to control the vehicle to deviate from a reference trajectory by a level of error sufficient to induce generation of a correction control signal to correct the vehicle's deviation from the reference trajectory, wherein determining the offsetting longitudinal control signal comprises generating a random direction and a random magnitude for the offsetting longitudinal control signal; and executing the offsetting longitudinal control signal followed by the correction control signal to modulate longitudinal vehicle dynamics of the vehicle, wherein inertial forces generated by modulating the longitudinal vehicle dynamics in response to the correction control signal notify the operator that the driving automation system is in an active state.

16. The non-transitory machine-readable medium of claim 15, wherein the offsetting longitudinal control signal includes at least one instance of acceleration or deceleration of the vehicle.

17. The non-transitory machine-readable medium of claim 15, wherein the reference trajectory includes at least one of a vehicle speed or a following distance to a leading vehicle.

18. The non-transitory machine-readable medium of claim 15, wherein the offsetting longitudinal control signal controls the vehicle to deviate from the reference trajectory by undershooting and overshooting the reference trajectory by the level of error.

19. The non-transitory machine-readable medium of claim 15, wherein the operations are executed periodically based on some passage of one of time, distance, or combination of both.

20. The non-transitory machine-readable medium of claim 15, wherein determining the offsetting longitudinal control signal is based on vehicle sensor information.

* * * * *